United States Patent Office 2,965,598
Patented Dec. 20, 1960

2,965,598

COMPOSITION COMPRISING VINYL CHLORIDE POLYMER AND BUTYL CARBOBUTOXY STEARATE

Gail H. Birum, Dayton, Ohio, and Tracy M. Patrick, Jr., Kirkwood, Mo., assignors to Monsanto Chemical Company, St. Louis, Mo., a corporation of Delaware No Drawing. Filed June 1, 1956, Ser. No. 588,613

3 Claims. (Cl. 260—31.8)

This invention relates to new compositions of matter. It is an object of the invention to provide as new compositions of matter, esters which are derived from the oxonation products of oleic acid and oleic esters. A further object of the invention is the provision of plasticizers of particular utility for vinyl halide resins.

In general, the compounds comprehended within the present invention are diesters of carboxystearic acid in which the non-terminal ester group is attached at a point along the stearic acid chain from the 2 to 17 position. A preferred group of the said esters are those having from 21 to 49 carbon atoms. Examples of esters illustrative of the present invention include butyl 9(10)-carbobutoxystearate, 2-ethylhexyl 9(10)-carebo-2-ethylhexyloxystearate, and dodecyl 9(10)-carbododecyloxystearate.

The present novel esters are prepared by a process that uses oleic acid or oleic esters as the starting materials. When oleic acid is subjected to oxonation with carbon monoxide and hydrogen in the presence of a carbonylation catalyst, the first compound which is obtained is formylstearic acid. The formyl radical may be attached at any point along the stearic acid chain. The largest proportion of isomers are at the 9 and 10 position, but shifting of the double bond results in the production of the other isomers substiuted in the 2 to 17 position along the stearic acid chain.

The above formyl stearic acid is then used to prepare carboxystearic acid by an oxidation step, such as by air oxidation. The said oxidation may also be carried out by the use of oxygen or oxygen-enriched air, employing oxidizing catalysts, for example, the salts of cobalt and manganese. Other oxidants such as nitric acid and chromic acid may also be employed as the oxidizing agents, as for example, by the direct liquid phase oxidation of the said formyl compounds described above.

The above-described acids are esterified by reaction with a lower alcohol, such as methyl alcohol, to obtain the novel esters, for example, methyl carbomethoxystearate.

If it is desired to obtain higher molecular weight esters which are of particular utility as plasticizers, either a transesterification process or direct esterification may be employed. Typical higher alcohols for this purpose are 2-ethylhexanol and dodecanol. Reaction of the latter higher alcohols, e.g., 2-ethylhexanol, with the above-described lower esters, such as the methyl esters, gives 2-ethylhexyl carbo-2-ethylhexyloxystearate. In general, the esterification may be carried out using alcohols having from 1 to 15 carbon atoms including glycols.

In this way, similarly to the di-2-ethylhexyl ester described above, the other dialkyl esters of carboxystearic acid are obtained from alcohols, while polyalkylesters of carboxystearic acid are obtained from glycols.

Examples of alcohols and glycols include methyl, ethyl, propyl, butyl, amyl, hexyl, heptyl, octlyl, nonyl, decyl, undecyl, dodecyl, tridecyl, tetradecyl, and pentadecyl alcohols and their isomers. Other monohydroxy and dihydroxy compounds may be employed such as the cyclohexanols, tetrahydrofurfuryl alcohol, 2-ethoxyethyl alcohol, 2-(N-butoxy)ethyl alcohol and glycols having from 2 to 15 carbon atoms, such as ethylene glycol, propylene glycol and butylene glycol.

The use of oleic esters as the starting material is also practical. Oxonation of the oleic esters such as ethyl or butyl oleate gives as the first product, ethyl formylstearate or butyl formylstearate, respectively. Oxidation of these compounds correspondingly gives ethyl carboxystearate or butyl carboxystearate. Esterification, for example, with butyl alcohol results in direct and trans-esterification to yield the novel compound butyl carbobutoxystearate.

Esterification of the above free acids may be conducted with catalysts such as sulfuric acid or toluenesulfonic acid monohydrate, employed in concentrations of from 0.1% to 5% by weight. An esterification is substantially complete in a period of from 5 to 8 hours and may be carried out using a solvent, for example, benzene or toluene, at a temperature corresponding to the boiling point of the solvent. In this way, the water produced in the esterification reaction may be removed azeotropically, such as by the use of a Dean and Stark trap. The trans-esterification of lower esters may be carried out by mixing the higher molecular weight alcohol with the lower ester in the presence of a catalyst. Heating then results in the removal of the lower alcohol to yield the desired higher molecular weight ester.

The following examples illustrate specific embodiments of the invention:

*Example 1*

A mixture of 431.5 g. (1.38 moles) of ethyl oleate, 250 ml. of benzene, 75 ml. of a benzene solution of cobalt carbonyl, and a 1:1 mixture of carbon monoxide and hydrogen were employed in the oxonation. The oxonation was carried out employing the said equimolar mixture of carbon monoxide and hydrogen at a pressure beginning at 4560 p.s.i. and at a temperature of about 117° C. The temperature was then maintained at about 133–144° C. with the pressure in the range of from 3675 to 5100 p.s.i. for a period of 2½ hours.

After the bomb had been cooled and solvent benzene removed, it was found that the crude product obtained amounted to 496 g. The crude product was found to be 23.8% aldehyde, calculated as $C_{21}H_{40}O_3$, as determined by hydroxylamine hydrochloride titration. Based on this analysis, the yield of ethyl formylstearate was 25%. The product consisted predominantly of ethyl 9-formylstearate and ethyl 10-formylstearate.

The above crude product of ethyl formylstearates was mixed with 500 ml. of glacial acetic acid and 1.0 g. of manganese acetate tetrahydrate. The said reaction mixture was placed in a 2-liter, 3-necked flask, equipped with a stirrer, a thermometer, a condenser, and a gas dispersion disk that extended below the liquid surface. The oxidation was conducted by introducing air at 28° into the liquid. It was found that the temperature of the reaction mixture increased to 75° C. in 4¼ hours without external heating. The temperature then dropped to 58° C. in one hour. Heat was then applied and the temperature maintained at 80° C. for the remainder of the oxidation during a period of 1½ hours. Dilution of the reaction mixture with water was found to cause separation of an upper product layer. This layer was removed from the reaction mixture and was then dissolved in hexane, washed with water, and extracted four times with 10% sodium hydroxide solution. Acidification of the aqueous solution with hydrochloric acid caused separation of a white, curdy product which was extracted with 500 ml. of benzene and washed twice with water. The benzene was removed by distillation. The product obtained was predominantly ethyl 9-carboxystearate and ethyl 10-carboxystearate.

*Example 2*

The above-described mixture of ethyl carboxystearates was esterified by reacting the same with 200 ml. of butanol together with 50 ml. of toluene as a solvent. The catalyst employed was 3.0 g. of p-toluenesulfonic acid. The esterification was conducted in a flask equipped with a Dean and Stark trap, and the mixture was refluxed until water no longer collected in the trap. At intervals during the esterification period, 125 ml. of distillate was removed, and 200 ml. of butanol and 100 ml. of toluene were added to the refluxing solution. At the end of the refluxing, 150 ml. of benzene was added and the solution was washed twice with cold 5% sodium bicarbonate solution and twice with water.

Distillation of the product resulting from the esterification gave 243 g. of a yellow liquid having a boiling range of 60–255° C. at 0.1–0.8 mm., and 17 g. of residue. The saponification equivalent of a fraction boiling at 215–216° C. at 2 mm. was 228.6 (calculated for $C_{27}H_{52}O_4$: 220.3). A second distillation gave 33.9 g. of a fraction having a boiling range of 65–190° C. at 0.1 mm. The refractive index of this fraction was $n_D^{25}$, 1.4412–1.4481. It was found that there was obtained 163.9 g. (27% overall yield) of a mixture predominantly composed of butyl 9-carbobutoxystearate and butyl 10-carbobutoxystearate. The said mixture of the dibutyl esters had a boiling range of 190–207° C. at 0.1–0.07 mm.; $n_D^{25}$ 1.4496, $d_4^{20}$ 0.938. There was also obtained 14.0 g. of a fraction having a boiling range of 207–218° C. at 0.07–0.12 mm.; $n_D^{25}$ 1.4520; and 18.3 g. residue.

Analysis of the fraction corresponding to butyl 9(10)-carbobutoxystearate, $C_{27}H_{52}O_4$, was found to give C, 73.84; H, 11.91. Calculated: C, 73.58; H, 11.90.

*Example 3*

The ester obtained in Example 1, i.e., ethyl 9(10)-formylstearate, was also oxidized using chromic acid, as the oxidizing agent, likewise resulting in the production of ethyl 9(10)-carboxystearate.

It has been found that the esters of carboxystearic acid, such as dibutyl, dihexyl, dioctyl, didecyl, didodecyl, and ditetradecyl esters have utility in numerous applications, for example as polymers and plasticizers, functional fluids, solvents, insect repellents, and as toxicants such as herbicides and insecticides.

The new esters are valuable plasticizers for polyvinyl chloride and copolymers of more than 70 percent of vinyl chloride and up to 30 percent of other monomers copolymerized therewith, such as another polymerizable monoethylenically unsaturated monomer, for example, vinyl acetate, acrylonitrile, vinylidene chloride and vinylidene fluoride. In general, the monomers are used in the proportion of at least 70 percent of vinyl chloride and up to 30 percent of another monoethylenically unsaturated monomer.

The plasticizers are blended with the vinyl resin in the conventional manner, for example, by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5 to 60 percent of plasticizer will, in most cases, produce a satisfactory composition for general utility. Such quantity of plasticizer will generally remain as a permanent part of the vinyl resin and the modified vinyl resin so prepared will not deteriorate by contact with liquid hydrocarbons or become embrittled by reason of the loss of the plasticizer during use.

The new esters are valuable plasticizers at very low temperatures. For example, it is found that 40% of the above-described butyl carbobutoxystearate in polyvinyl chloride results in a plasticized product which has a low temperature flex of less than −60° C. In comparison, the conventional plasticizer, dioctyl phthalate, employed in the same concentration and measured for low temperature flexibility, is found to have a value of about −35° C.

The new plasticizers comprising the above-described esters having from 21 to 49 carbon atoms are of general utility in softening vinyl chloride polymers and are effective over a wide range of temperatures. They may be used as the only plasticizing component in a compound with vinyl chloride polymer or they may be used in conjunction with other plasticizers.

What is claimed is:

1. A resinous composition of matter which comprises a polymer selected from the group consisting of polyvinyl chloride and copolymers of at least 70 percent of vinyl chloride and up to 30 percent of another monoethylenically unsaturated monomer, and butyl 10-carbobutoxystearate.

2. A resinous composition of matter which comprises a polymer selected from the group consisting of polyvinyl chloride and copolymers of at least 70 percent of vinyl chloride and up to 30 percent of another monoethylenically unsaturated monomer, and butyl 9-carbobutoxystearate.

3. A resinous composition of matter which comprises a polymer selected from the group consisting of polyvinyl chloride and copolymers of at least 70 percent of vinyl chloride and up to 30 percent of another monoethylenically unsaturated monomer, and a compound selected from the group consisting of butyl 9-carbobutoxystearate, butyl 10-carbobutoxystearate, and mixtures thereof.

References Cited in the file of this patent

UNITED STATES PATENTS

| | | |
|---|---|---|
| 2,332,849 | Gruber et al. | Oct. 26, 1943 |
| 2,456,366 | Bren et al. | Dec. 14, 1948 |
| 2,703,811 | Smith | Mar. 8, 1955 |
| 2,782,227 | Dazzi | Feb. 19, 1957 |

FOREIGN PATENTS

| | | |
|---|---|---|
| 715,743 | Great Britain | Sept. 22, 1954 |
| 806,279 | France | Dec. 11, 1936 |